United States Patent
Xiang

(10) Patent No.: US 10,129,727 B2
(45) Date of Patent: Nov. 13, 2018

(54) INFORMATION INTERACTION METHOD AND SYSTEM APPLYING TO ELECTRONIC CIGARETTE

(71) Applicant: SHENZHEN KIMSEN TECHNOLOGY CO., LTD, Shenzhen, Guangdong (CN)

(72) Inventor: Zhiyong Xiang, Guangdong (CN)

(73) Assignee: SHENZHEN KIMSEN TECHNOLOGY CO., LTD, Shenzhen (CN)

( * ) Notice: Subject to any disclaimer, the term of this patent is extended or adjusted under 35 U.S.C. 154(b) by 25 days.

(21) Appl. No.: 15/301,407

(22) PCT Filed: Apr. 3, 2014

(86) PCT No.: PCT/CN2014/074770
§ 371 (c)(1),
(2) Date: Oct. 3, 2016

(87) PCT Pub. No.: WO2015/149340
PCT Pub. Date: Oct. 8, 2015

(65) Prior Publication Data
US 2017/0118584 A1    Apr. 27, 2017

(51) Int. Cl.
*H04W 4/80* (2018.01)
*A24F 47/00* (2006.01)

(52) U.S. Cl.
CPC ............. *H04W 4/80* (2018.02); *A24F 47/008* (2013.01)

(58) Field of Classification Search
CPC ............................ H04W 4/80; A24F 47/008
See application file for complete search history.

(56) References Cited

U.S. PATENT DOCUMENTS

2013/0284192 A1    10/2013    Peleg et al.
2015/0181945 A1*   7/2015     Tremblay .............. A24F 47/008
                                                    131/328

OTHER PUBLICATIONS

International Search Report of PCT Patent Application No. PCT/CN2014/014770 dated Jan. 5, 2015.

* cited by examiner

*Primary Examiner* — Junpeng Chen

(57) ABSTRACT

The present invention provides an information interaction method and system applying to electronic cigarettes, used for at least two electronic cigarettes transmitting information by using electromagnetic wave signals to perform information interaction within a preset distance. Beneficial effects of implementing the present invention are: the information interaction can be performed between the electronic cigarettes, thereby greatly facilitating information exchange and obtaining between each other and helping in establishing social communication between users; statistics collection and processing on electronic cigarette information can offer a help for the users to select the electronic cigarettes suiting themselves. In addition, a vibration sensor is used to detect vibration signals of the electronic cigarettes themselves, thereby proving beneficial effects of easy use and flexible operations.

11 Claims, 6 Drawing Sheets

INFORMATION INTERACTION METHOD AND SYSTEM APPLYING TO ELECTRONIC CIGARETTE

FIELD OF THE INVENTION

The present application relates to the field of electronic cigarettes, and more particularly relates to an information interaction method and system applying to electronic cigarettes.

BACKGROUND OF THE INVENTION

An electronic cigarette comprises a battery assembly and an atomizing assembly, makes use of heating the tobacco oil to atomize, so as to provide a substitute of cigarette for smokers.

Except for is a substitute of cigarette to meet the needs of smoking of a user, the current electronic cigarette does not have any communication functions such as an information transmission when smoking, then the user experience is poor. Besides, because the electronic cigarette does not have a function of mutual communications, the users can not share the information of the electronic cigarette, and cannot timely found a person around who has similar electronic cigarette smoking preferences. Also users cannot guide themselves a choice of an optimal and a suitable electronic cigarette based on other user's choices of electronic cigarettes.

There are defects in prior art, which need to be improved.

SUMMARY OF THE INVENTION

Aiming at the defects of the prior art, the present application provides an information interaction method and system applying to electronic cigarettes.

The technical solutions of the present application for solving the technical problems are as follows: providing an information interaction method applying to electronic cigarettes, used for transmitting information by using electromagnetic wave signals to perform an information interaction within a preset distance between at least two electronic cigarettes;

the method comprises following steps:

a, after at least one electronic cigarette detecting a vibration signal of the electronic cigarette itself, transmitting requesting information with requesting for an electronic cigarette information to one or more of other electronic cigarettes;

b, the electronic cigarette which receives the requesting information transmits response information with its own electronic cigarette information to the electronic cigarette which transmits the requesting information;

c, the electronic cigarette which transmits the requesting information receives the response information to obtain the electronic cigarette information in the response information, and performs at least one of the following operations: storing the obtained electronic cigarette information, displaying the obtained electronic cigarette information, transmitting a prompt information according to the obtained electronic cigarette information, forwarding the obtained electronic cigarette information.

In the information interaction method applying to electronic cigarettes in present invention, the step a comprises: after at least one electronic cigarette detecting vibration signal of itself, selecting the type of electronic cigarette information being obtained, and transmitting the requesting information with corresponding type.

In the information interaction method applying to electronic cigarettes in present invention, the type of electronic cigarette information comprises at least one kind of followings information: electronic cigarette model, electronic cigarette battery capacity size, electronic cigarettes applicable charger model, the information of electronic cigarette manufacturers, electronic cigarette manufacturing country, personal user information.

In the information interaction method applying to electronic cigarettes in present invention, wherein, the requesting information comprises: heading code field, identification code field, data field and the check code field;

wherein the data field is used to identify the type of electronic cigarette information which the requesting information requests.

In the information interaction method applying to electronic cigarettes in present invention, wherein, the response information comprises: heading code field, identification code field, data field and the check code field;

wherein the data field is used to identify the type of electronic cigarette information and the corresponding electronic cigarette information.

In the information interaction method applying to electronic cigarettes in present invention, in the step b, selecting the type of electronic cigarette information being obtained by detecting the times of smoking signals produced;

the times of smoking signals produced is corresponding to the type of electronic cigarette information identified by the data field of the requesting information or response information.

In the information interaction method applying to electronic cigarettes in present invention, in the step b, selecting the type of electronic cigarette information being obtained by an input module;

the signals inputted by input module is corresponding to the type of electronic cigarette information identified by the data field of the requesting information or response information.

In the information interaction method applying to electronic cigarettes in present invention, the method further comprises:

after the electronic cigarette which transmits the requesting information receiving the response information and obtaining the electronic cigarette information of the response information, processing the obtained electronic cigarette information.

The present invention provides an information interaction method applying to electronic cigarettes in present invention, used for at least two electronic cigarettes transmitting information by using electromagnetic wave signals to perform information interaction within an area formed by preset distance;

the method comprises following steps:

S1, transmitting information step: after at least one electronic cigarette in the area detects vibration signal of itself then transmitting broadcast information with its own electronic cigarette information to other electronic cigarettes in the area, and/or transmitting requesting information with request for electronic cigarette information to one or more of other electronic cigarettes in the area, and/or transmitting response information for replying to request of the other electronic cigarettes;

S2, receiving information step: at least one electronic cigarette receives the broadcast information transmitted by other electronic cigarettes in the area with their own electronic cigarette information, and/or receives requesting information with request for electronic cigarette information transmitted by the other electronic cigarettes in the area, and/or receives response information replied by the other electronic cigarettes requested;

S3, processing information step: at least one electronic cigarette which receives the broadcast information or receives the response information performs at least one of the following operations: storing the obtained electronic cigarette information, displaying the obtained electronic cigarette information, transmitting a prompt information according to the obtained electronic cigarette information, forwarding the obtained electronic cigarette information.

The present invention further provides an information interaction system applying to electronic cigarettes, the system comprises at least two electronic cigarettes performing information interaction within preset distance, each electronic cigarette comprises: a vibration sensor, a radio frequency communication module, a microprocessor, a storage module, a prompt module;

for an electronic cigarette which transmits requesting information:

the vibration sensor is used for detecting the vibration signal of the electronic cigarette itself and transmitting the vibration signal to the microprocessor, the microprocessor is used for controlling the radio frequency communication module to transmit requesting information with request for electronic cigarette information to one or more of other electronic cigarettes;

for an electronic cigarette which receives the requesting information:

the microprocessor is used for controlling the radio frequency communication module to receive the requesting information, identifying the type of electronic cigarette information requested by the electronic cigarette which transmits the requesting information, and controlling the radio frequency communication module to transmit response information with its own electronic cigarette information to the electronic cigarette which transmits the requesting information;

the microprocessor of the electronic cigarette which transmits the requesting information is further used for controlling the radio frequency communication module of the electronic cigarette which transmits the requesting information to receive the electronic cigarette information of the response information, and performs at least one of the following operations: storing the obtained electronic cigarette information in the storage module, controlling a display module to display the obtained electronic cigarette information, controlling the prompt module according to the obtained electronic cigarette information to transmit a prompt information, controlling the radio frequency communication module to forward the obtained electronic cigarette information, deleting the obtained electronic cigarette information.

In the information interaction system applying to electronic cigarettes in present invention, each electronic cigarette of the system comprises: a smoking sensor or smoking button;

the smoking sensor or smoking button is used for generating a smoking signal and transmitting the smoking signal to the microprocessor;

the microprocessor controls the radio frequency communication module according to the received smoking signal to transmit requesting information or response information.

The information interaction system applying to electronic cigarettes in present invention, wherein, each electronic cigarette further comprises an input module which is used for inputting a select signal to the microprocessor to select the type of the electronic cigarette information being obtained, the input module is connected with the microprocessor.

The implementation of the present invention has the following beneficial effects: the electronic cigarette with the radio frequency communication function within a small range can exchange information with other electronic cigarettes also have a radio frequency communication function within a small range, greatly facilitating the exchange of information between each other to be obtained. Thus, the electronic cigarette is not only a cigarette, but also becomes a bridge for people to communicate. Through statistical treatment of the electronic cigarette information, it can provide help to users in choosing the optimal and suitable electronic cigarettes; and can facilitate building social connections between the users of electronic cigarettes, being conducive to communication between users and to quit smoking. Besides, with a vibration sensor to detect the vibration signal of the electronic cigarette itself so as to trigger the electronic cigarette send information to other electronic cigarette, it has a beneficial effect of a more convenient and flexible application.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

To make the technical feature, objective and effect of the present application be understood more clearly, now the specific implementation of the present application is described in detail with reference to the accompanying drawings and embodiments.

The information interaction method applied to the electronic cigarette in the embodiments of the present invention uses at least two electronic cigarettes connected in a short distance communication area to exchange information, so as to realize the information interaction of an electronic cigarette between electronic cigarettes; and through a shake of the electronic cigarette, the electronic cigarette transmits requesting information after detecting vibration signal of the electronic cigarette itself. It is more convenient to use, a switch button is not necessary to be specially set for triggering information interaction, breaking the shortcomings of a traditional switch button trigger or a touch trigger that need to be fixed at a specific location, and greatly improving the flexibility of product designs.

In this embodiment of present invention, the electronic cigarette comprises a radio frequency communication module, and using radio frequency communication technology to realize communication, for example, wifi, bluetooth and so on, or using frequency such as 315 MHZ, 433 MHZ or 900 MHZ to proceed a radio frequency communication.

Figure 1:
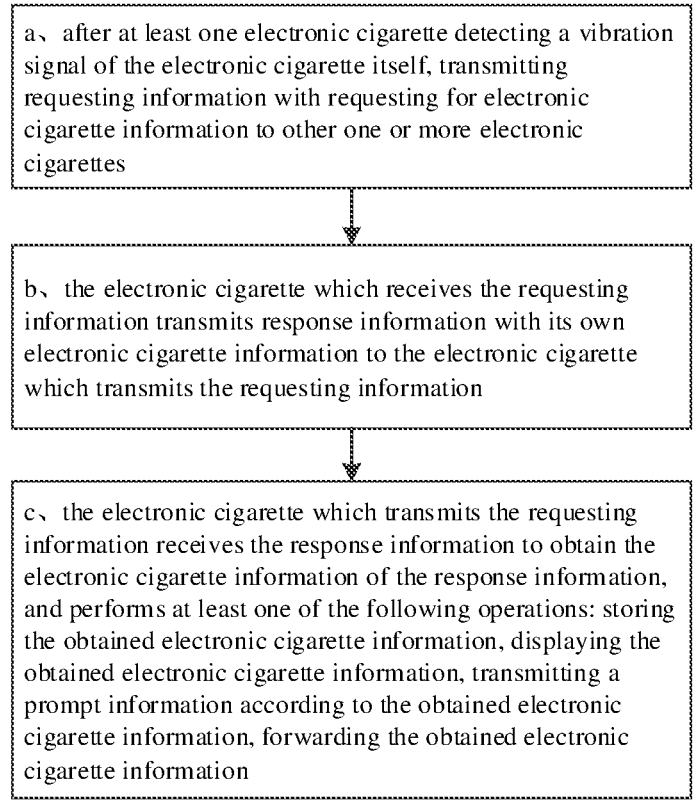
FIG. 1 is a flow chart of an information interaction method applying to electronic cigarettes in a first embodiment.

As shown in FIG. 1, FIG. 1 is a flow chart of an information interaction method applying to electronic cigarettes in a first embodiment.

The information interaction method in this embodiment of present application used for at least two electronic cigarettes to transmit information by using electromagnetic wave signals to perform information interaction within a preset distance. The information interaction method applying to electronic cigarettes in this embodiment of present application comprises following steps:

a, after at least one electronic cigarette detecting a vibration signal of the electronic cigarette itself, transmitting requesting information with requesting for electronic cigarette information to other one or more electronic cigarettes;

b, the electronic cigarette which receives the requesting information transmits response information with its own electronic cigarette information to the electronic cigarette which transmits the requesting information;

c, the electronic cigarette which transmits the requesting information receives the response information to obtain the electronic cigarette information in the response information, and performs at least one of the following operations: storing the obtained electronic cigarette information, displaying the obtained electronic cigarette information, transmitting a prompt information according to the obtained electronic cigarette information, forwarding the obtained electronic cigarette information.

The requesting information can be a constant information which is transmitted directly as long as the vibration sensor of the electronic cigarette detecting the vibration of the electronic cigarette.

The requesting information can include a variety of types, so the step a specifically comprises: after at least one electronic cigarette detecting a vibration signal of itself, transmitting a prompt information, selecting the type of electronic cigarette information being obtained, and transmitting the requesting information with corresponding type. In this step, the type of transmitting a prompt information can be sending out beeps and can also be giving a flash signal.

Specifically, the types of electronic cigarette information comprises at least one kind of followings information: an electronic cigarette model, an electronic cigarette battery capacity size, an electronic cigarette applicable charger model, information of electronic cigarette manufacturers, an electronic cigarette manufacturing country, personal user information. The personal user information comprises at least one kind of followings: name, contact information, interests, occupation. The types of electronic cigarette information and the electronic cigarette information its own are stored in the electronic cigarette in this embodiment of present application.

In this embodiment of present application, the requesting information comprises: a heading code field, an identification code field, a data field and a check code field; wherein, the data field is used to identify the type of the electronic cigarette information which the requesting information requests. The response information comprises: a heading code field, an identification code field, a data field and a check code field; wherein, the data field is used to identify the type of the electronic cigarette information and the corresponding electronic cigarette information.

Figure 2:
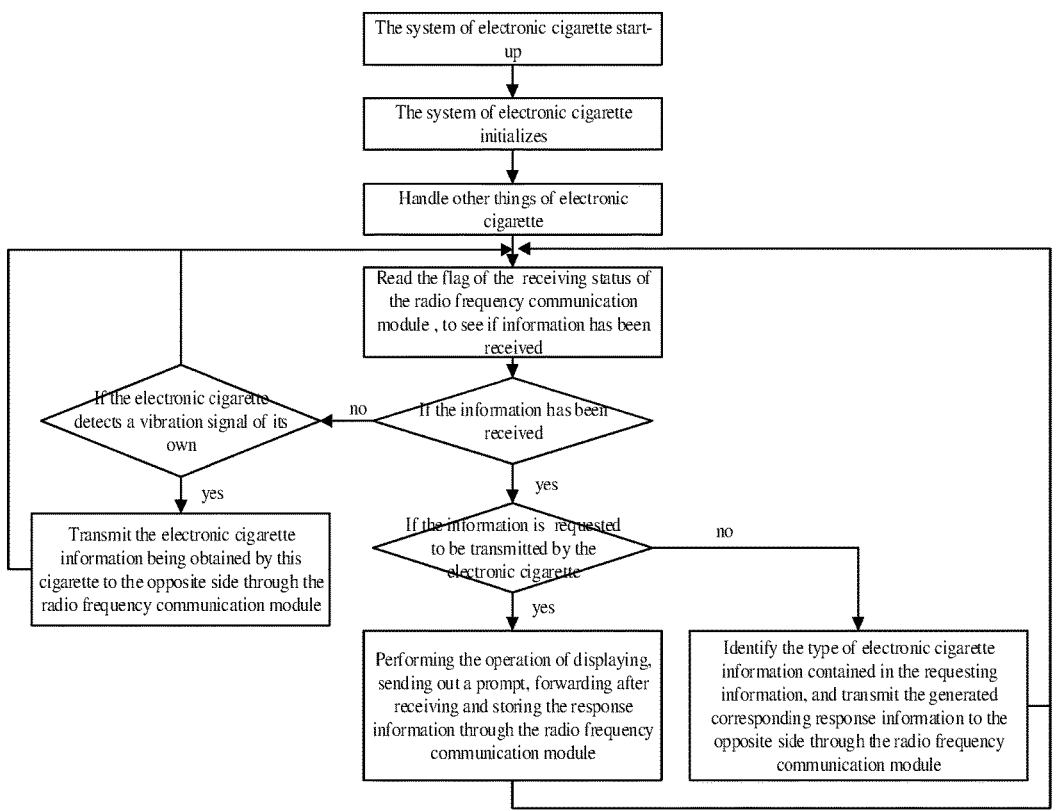
FIG. 2 is a flow chart of an information interaction method applying to electronic cigarettes in a second embodiment.

As shown in FIG. 2, in a second embodiment of present application, the electronic cigarettes can be set as automatically receiving information mode (that is when other electronic cigarettes transmit requesting information or response information within the communication range, receiving information automatically) and automatically transmitting response information mode (that is when receiving the requesting information, transmitting the response information automatically).

Figure 3:
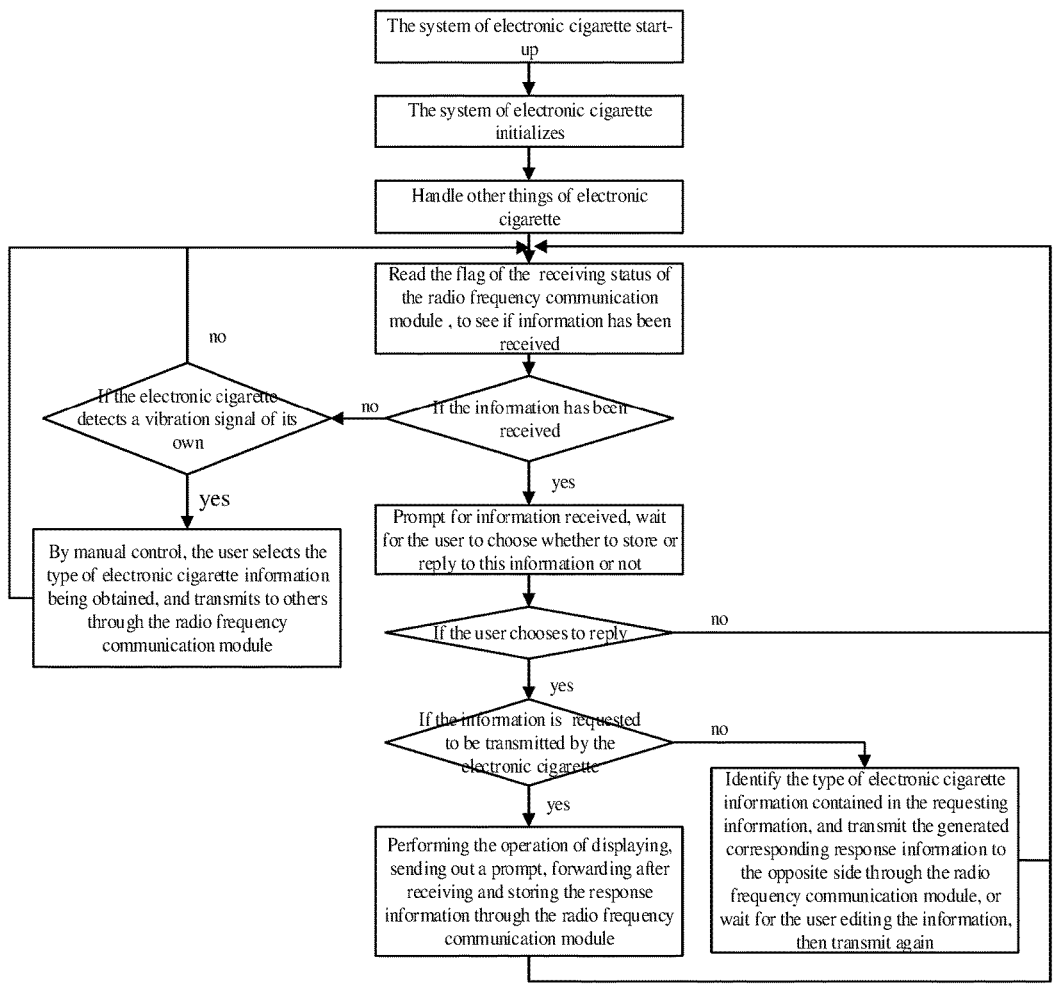
FIG. 3 is a flow chart of an information interaction method applying to electronic cigarettes in a third embodiment.

In addition, as shown in FIG. 3, in a third embodiment of present application, the electronic cigarettes can be set as manually receiving, manually transmitting mode. The manually receiving information mode is when other electronic cigarettes transmit requesting information or response information within the communication range, the electronic cigarette sends out a prompt information (voice, display prompt, etc.), if users choose to receive information, then the electronic cigarette receives the information, otherwise do not receive the information; for instance, shaking the electronic cigarette, the electronic cigarette receives information after detecting the vibration signal, if within a scheduled time after the electronic cigarette sending the prompt message, such as after 5 seconds, a vibration signal has not been detected, the electronic cigarette refuses to accept the electronic cigarette information automatically. Manually transmitting information mode comprises: when transmitting the requesting information, after the electronic cigarette detecting a vibration signal of its own, manually choosing the type of electronic cigarette information being obtained; and when transmitting the response information, first to detect the vibration signal of the electronic cigarette itself, then the electronic cigarette transmits the response information.

Specifically, the ways of manually choosing the types of the electronic cigarette information comprise the following: first, using electronic cigarettes input module (for example, buttons, touch screen, etc.) to trigger buttons to select for the types of electronic cigarette information, the select signals inputted by the input module are different, the types of electronic cigarette information identified by the data field of the requesting information or response information are different. The second is to use the smoking signals generated by smoking sensors or smoking buttons, according to the times of the generated smoking signals are different, the types of electronic cigarette information identified by the data field of the requesting information or response information are different.

Specifically, the corresponding relation between the times of generated smoking signals and the types of electronic cigarette information identified can be set up by the data field: the times of generated smoking signals is one time, then the types of electronic cigarette information corresponds to the electronic cigarette model; the times of generated smoking signals is two times, then the types of electronic cigarette information corresponds to the electronic cigarette battery capacity size; the times of generated smoking signals is three times, then the types of electronic cigarette information corresponds to the electronic cigarette applicable charger model; the times of generated smoking signals is four times, then the types of electronic cigarette information corresponds to the information of electronic cigarette manufacturers; the times of generated smoking signals is five times, then the types of electronic cigarette information corresponds to the electronic cigarette manufacturing country; the times of generated smoking signals is six times, then the types of electronic cigarette information corresponds to the personal user information. As a result, when users need to get electronic cigarette information of other electronic cigarettes, the users just smokes after shaking the electronic cigarette, then the need can be realized, with convenient operation and improving the user' experience.

In this embodiment of present application, if the input module of the electronic cigarette is a key, the corresponding relation between the key input signals and the types of electronic cigarette information can be set up as following methods: pressing the key once, then the types of electronic cigarette information corresponds to the electronic cigarette model; pressing the key two times, then the types of electronic cigarette information corresponds to the electronic cigarette battery capacity size; pressing the key three times, then the types of electronic cigarette information corresponds to the electronic cigarette applicable charger model; pressing the key four times, then the types of electronic cigarette information corresponds to the information of electronic cigarette manufacturers; pressing the key five times, then the types of electronic cigarette information corresponds to the electronic cigarette manufacturing country; pressing the key six times, then the types of electronic cigarette information corresponds to the personal user information.

If the input module is touch input module or key input module, then user can directly input the type of electronic cigarette information (such as mobile phone input mode).

Understandably, in case the electronic cigarette receives the requesting information, it is not need to realize the settings of the electronic cigarette information types by the above methods to reply the response information, the electronic cigarette can realize reply of the response information by obtaining the types of the electronic cigarette information from the requesting information. In case the electronic cigarette does not receive the requesting information, the electronic cigarette initiatively transmits the response information with its own type of electronic cigarette information and the electronic cigarette information to other electronic cigarettes, the above methods can realize the setting of the type of the electronic cigarette information.

In this embodiment of present application, the electronic cigarettes with short distance communication function can close communication connection, which can avoid receiving the requesting information or response information transmitted by other electronic cigarettes, to prevent information harassment.

In this embodiment of present application, using hexadecimal to identify the types of the electronic cigarette information. Specifically, using "0X01", "0X02", "0X03", "0X04", "0X05", "0X06" to identify the electronic cigarette information of the electronic cigarette model, the electronic cigarette battery capacity size, the electronic cigarettes applicable charger model, the information of electronic cigarette manufacturers, the electronic cigarette manufacturing country and the personal user information respectively.

In this embodiment of present application, using hexadecimal to identify the electronic cigarette information contained in the types of the electronic cigarette information. For instance, for electronic cigarette models, if the corresponding specific electronic cigarette information including: type 1, type 2, type 3, then respectively using "0X01", "0X02", "0X03" to identify the type 1, type 2, type 3. Another example, for electronic cigarette manufacturing country, if the specific electronic cigarette information including: China, USA, Japan, then respectively using "0X01", "0X02", "0X03" to identify China, USA, Japan, and by this analogy, the table of the corresponding relation between the type of the electronic cigarette information and its specific electronic cigarette information can be obtained as shown in table 1. In this embodiment of present application, electronic cigarettes can be stored according to the corresponding relation table.

TABLE 1

| Type of electronic cigarette information | Specific electronic cigarette information | hexadecimal corresponding specific electronic cigarette information |
|---|---|---|
| electronic cigarette model | Model 1 | 0X01 |
| | Model 2 | 0X02 |
| | Model 3 | 0X03 |
| electronic cigarette battery capacity size | 650 mAH | 0X01 |
| | 1000 mAH | 0X02 |
| electronic cigarettes applicable charger model | charger model 1 | 0X01 |
| | charger model 2 | 0X02 |
| the information of electronic cigarette manufacturers | manufacturers 1 | 0X01 |
| | manufacturers 2 | 0X02 |
| | manufacturers 3 | 0X03 |
| electronic cigarette manufacturing country | china | 0X01 |
| | USA | 0X02 |
| | Japan | 0X03 |

Both the requesting or response information transmitted by the electronic cigarette comprises: a heading code field, an identification code field, a data field and a check code field. Wherein, the size of the heading code field is 1 byte code field, for example, the heading code field can be set as "0X55". The size of the identification code field is 1 byte code field, used for identifying whether the information transmitted by the electronic cigarette is requesting or response information, can be set like this: if it is requesting information then the identification code field is "0X65", if it is response information then the identification code field is "0X9A". The check code field is 1 or 2 byte code field, used for realizing the information check, specifically, the way of checksum check or CRC cyclic check can be used to check. The length of the data field adjusts according to the actual situation.

If the identification code field identification identifies the information transmitted by the electronic cigarette as requesting information, then the information contained by the data field is a request for electronic cigarette information, for instance, if the data field is "0X01", means the requesting information transmitted by the electronic cigarette, is a request for the information of "electronic cigarette model" of other electronic cigarettes, so the response information of other electronic cigarette should include their own types of electronic cigarettes information; if the data field is "0X02", means requesting the information of "electronic cigarette battery capacity size", other and so on.

If the identification code field identifies the information transmitted by the electronic cigarette as response information, then the data field includes the electronic cigarette information. And the electronic cigarette information is correspond with the request of obtaining the electronic cigarette information. For example, if the data fields of the requesting information is "0X01", then the data fields of the response information is "0X01 0X01", which means: the type of the electronic cigarette is 0X01.

In this embodiment of present application, if the response information includes the personal user information, using GB2312 location code to code the personal user information and constitute the data fields to form a response information.

In addition, the hexadecimal in this embodiment of present application can also be replaced by the binary, decimal, etc.

Combined with a specific implementation of the present application as following, to describe in detail of the information interaction method applying to electronic cigarettes in this embodiment of present application:

Suppose there are 5 electronic cigarettes existing communication connection in an area of short distance, an electronic cigarette A and an electronic cigarette B are two of the electronic cigarettes. If the electronic cigarette A wants to transmit a requesting information including the request of "electronic cigarette model" to the electronic cigarette B, but the model of the electronic cigarette B is model 2, then the electronic cigarette A can realize the obtaining of model of the electronic cigarette B through the following three ways:

way 1: the electronic cigarette A transmit requesting information to other 4 electronic cigarettes in the form of broadcast, the requesting information is:

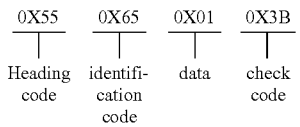

after the electronic cigarette B receiving the requesting information, and decoding, as "0X65" means the information is requesting information, but "0X01" means "electronic cigarette model", as a result, the response information generated by the electronic cigarette B according to the stored electronic cigarette model of its own is:

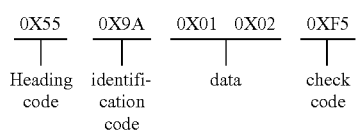

way 2: the five electronic cigarettes have their own ID respectively, the electronic cigarette A initiates a communication request to the electronic cigarette B according to the ID of the electronic cigarette B, after the electronic cigarette B receives the request (as shown in above way 1), and the electronic cigarette B only replies a response information to the electronic cigarette A (the response information is as shown in way 1 above).

way 3: the five electronic cigarettes have their own ID respectively, and each electronic cigarette stores its own ID information and others' electronic cigarettes ID information. The electronic cigarette A transmit requesting information to other 4 electronic cigarettes in the form of broadcast, and add its own ID information and the ID information of electronic cigarette A in the requesting information, namely the requesting information is:

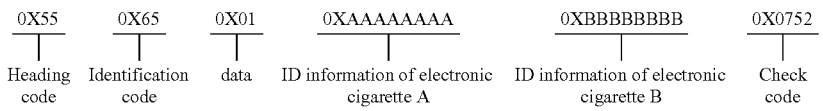

The electronic cigarette B decodes after receiving the requesting information, and generates the response information as following:

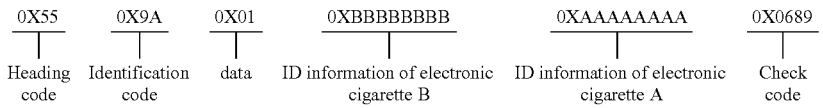

Thus, the electronic cigarette A can receive the response information, to obtain the model of the electronic cigarette B.

Through the three ways above, the electronic cigarette A can get the "electronic cigarette model" of the electronic cigarette B is "model 2", through decoding received response information, thus, the electronic cigarette A can further perform the operations of storage, display and so on, and can forward the model of electronic cigarette B, or compare the "electronic cigarette model" of electronic cigarette B with its own "electronic cigarette model", if same, then send out a prompt information and so on.

Understandably, if the electronic cigarette A needs to get multiple (2, 3, etc.) "electronic cigarette model" of electronic cigarettes, the electronic cigarette A can transmit the requesting information through the way of broadcast. Preferably, in order to ensure that the multiple electronic cigarettes will reply response information, the way 2 can be adopt, to establish instant communication connection with every electronic cigarettes respectively; the way 3 can also be adopted, through the way of putting the ID information of multiple electronic cigarettes in the different requesting information respectively, to transmit multiple requesting information, to make sure that the multiple electronic cigarettes will reply response information.

In this embodiment of present application, if the electronic cigarette A has received information of multiple electronic cigarettes (such as "electronic cigarette model" information), then a statistical analysis can be carried out. Statistical analysis including: counting the same kind of information obtained, for example, the "electronic cigarette model" information of four electronic cigarettes has been obtained, then counting the number of model 1, model 2, model 3 respectively, and sorting, thus, the users of which kind of "electronic cigarette model" is more can be known, to provide useful help for choosing "electronic cigarette model".

In this embodiment of present application, when the electronic cigarettes exchanging other information (the electronic cigarette battery capacity size, the electronic cigarettes applicable charger model, the information of electronic cigarette manufacturers, the electronic cigarette manufacturing country, the personal user information), the implementation is same with the implementation principle of interaction of "electronic cigarette model" above, no longer say here.

In this embodiment of present application, the information interaction method applying to electronic cigarettes is further used for implementing emergency call, the specific implementation way is:

after receiving the triggering signal of the emergency button, transmitting emergency call information, the emergency call information comprising field identified with emergency calls. For example, the identification code field of the requesting information above can be set as "0X10", the data field can be set as "0X00", when other electronic cigarettes receiving such information and can identify the information for emergency contact information by decoding, thus, a prompt information can be send out to prompt the user (for example, displaying "SOS" through the display module of the electronic cigarette and sending out alarm, etc.), then the user will know someone around is in emergency call, to timely assistant for emergency callers.

In this embodiment of present application, the emergency button can be set as a separated button and can further be shared with the input module (key, touch screen, etc.). When shared with the input module of the electronic cigarette, the triggering can be set, for example, as that the emergency call information will be transmitted when pressing the input module or smoking button for 10 seconds, continuously inputting five times and so on to trigger electronic cigarette.

As a result, the information interaction method applying to electronic cigarettes in this embodiment of present application, when the user are under the case of emergency, such as sudden major disease (heart disease, faint, etc.), the electronic cigarette in hand can be used to send emergency contact information to nearby electronic cigarettes for emergency call, and providing a security for the users.

Figure 4:
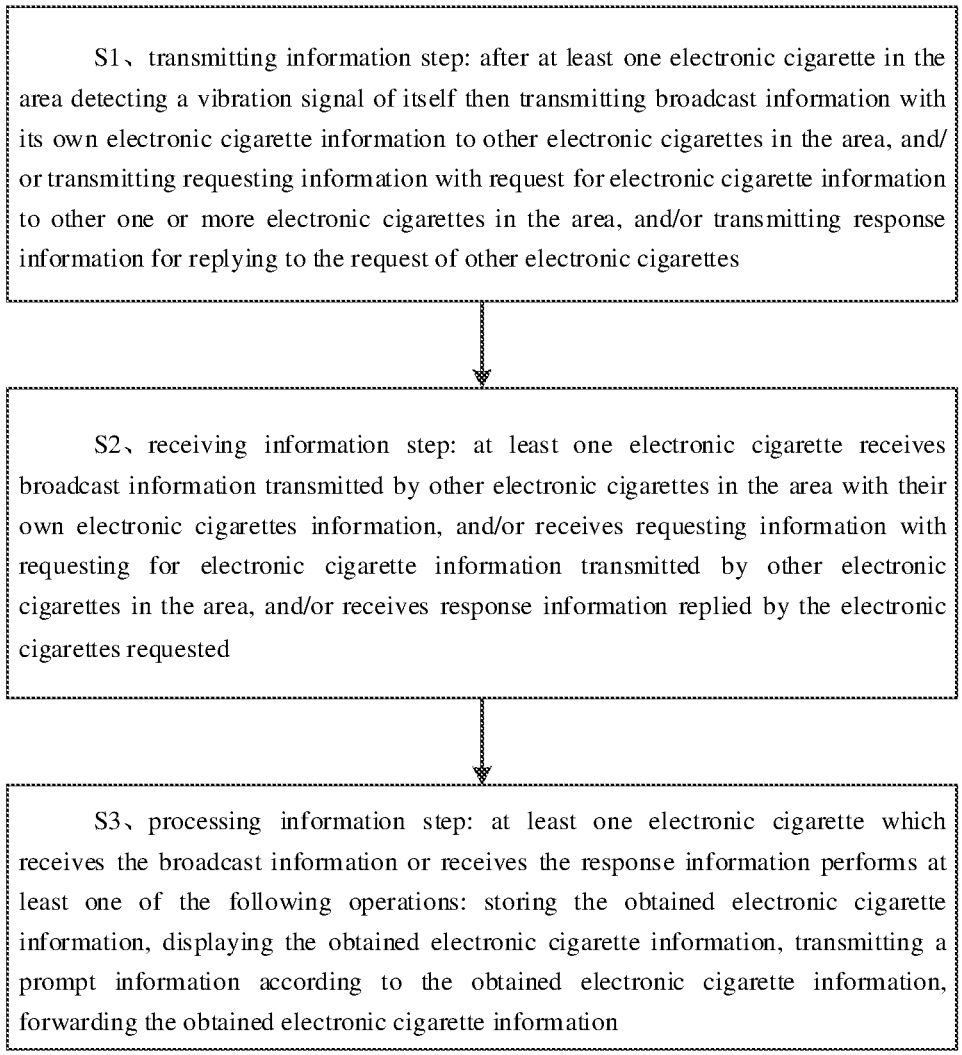
FIG. 4 is a flow chart of an information interaction method applying to electronic cigarettes in a fourth embodiment.

As shown in FIG. 4 is a flow chart of an information interaction method applying to electronic cigarettes, in this embodiment, using at least two electronic cigarettes with a communication connection within an area of a short distance to exchange information, specifically including following steps:

S1, transmitting information step: after at least one electronic cigarette in the area detects a vibration signal of itself then transmitting broadcast information with its own electronic cigarette information to other electronic cigarettes in the area, and/or transmitting requesting information with request for electronic cigarette information to other one or more electronic cigarettes in the area, and/or transmitting response information for replying to the request of other electronic cigarettes;

S2, receiving information step: at least one electronic cigarette receives broadcast information transmitted by other electronic cigarettes in the area with their own electronic cigarettes information, and/or receives requesting information with request for electronic cigarette information transmitted by other electronic cigarettes in the area, and/or receives response information replied by the electronic cigarettes requested;

S3, processing information step: at least one electronic cigarette which receives the broadcast information or receives the response information performs at least one of the following operations: storing the obtained electronic cigarette information, displaying the obtained electronic cigarette information, transmitting a prompt information according to the obtained electronic cigarette information, forwarding the obtained electronic cigarette information.

Specifically, in this embodiment, the information interaction way between the electronic cigarettes comprises: after one electronic cigarette transmitting requesting information (response of broadcast mode, one-to-one mode or one-to-more mode); or the electronic cigarette actively transmitting response information to other electronic cigarettes (transmitting way of broadcast mode, one-to-one mode or one-to-more mode). In this embodiment, the information interaction way between the electronic cigarettes comprises broadcast mode, one-to-one mode or one-to-more mode. In the way of one-to-one or one-to-more, two electronic cigarettes with information interaction can establish a connection first, then starting information interaction.

Understandably, the implementation principle of requesting information, response information, types of electronic cigarette information, electronic cigarette information, emergency call, manually receive and automatically receive and the process of transmitting information after detecting the vibration signal in this embodiment are the same with above embodiments, so here no longer describe.

In the information interaction method applying to electronic cigarettes in this embodiment of present invention, the requesting information or response information transmitted by the electronic cigarette can also be encrypted (can use the existing encryption algorithm), then the electronic cigarettes received information can use corresponding decryption algorithm to decode, thus, enhancing the security of the information interaction between electronic cigarettes.

Figure 5:
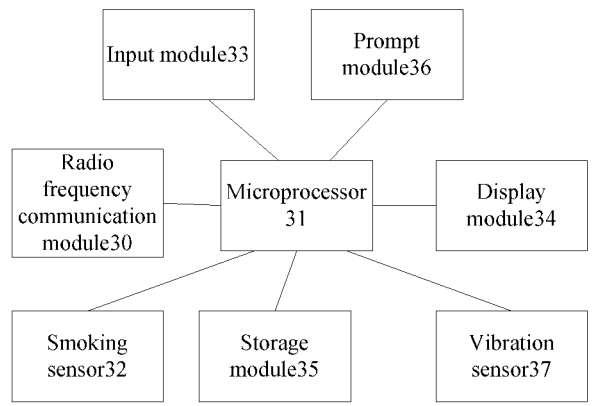
FIG. 5 is a principle diagram of an electronic cigarette in the present invention.

As shown in FIG. 5 is a principle diagram of an electronic cigarette in the present invention. In this embodiment of present invention, the electronic cigarette comprises: a radio frequency communication module 30, a microprocessor 31, a smoking sensor 32, an input module 33, a display module 34, a storage module 35, a prompt module 36 and a vibration sensor 37 and so on. In addition, the electronic cigarette further comprises an atomizing assembly used for atomizing the tobacco oil, a battery used for supplying power and so on, the smoking sensor 32 is used for generating smoking signal, the microprocessor 31 controls the atomizing assembly to atomize the tobacco oil according to the smoking signal. The smoking sensor 32 can be replaced by a smoking key. These all belong to the prior art, this embodiment of the present invention here no longer describe.

Wherein, the radio frequency communication module 30 realizes the communication by using radio frequency technology. The radio frequency communication module 30 comprises sending and receiving antennas, a demodulation circuit, an amplifying circuit, etc. The radio frequency communication module 30 can be wifi module, bluetooth module and so on, or module using frequency of 315 MHZ, 433 MHZ or 900 MHZ to realize a radio frequency communication. The microprocessor 31 is a programmable component, for example, a CPU. The storage module 35 is used for storing the type of electronic cigarette information above and corresponding electronic cigarette information, the mode of the microprocessor 31 can be SN8P2711B. The smoking sensor 32 can be a pressure sensor or an air flow sensor, understandably, the smoking sensor 32 can be replaced with key switch. The input module 33 is key input module or touch panel input module. The display module 34 is LED light or LCD screen and so on. The storage module 35 is flash module and so on.

Figure 7:
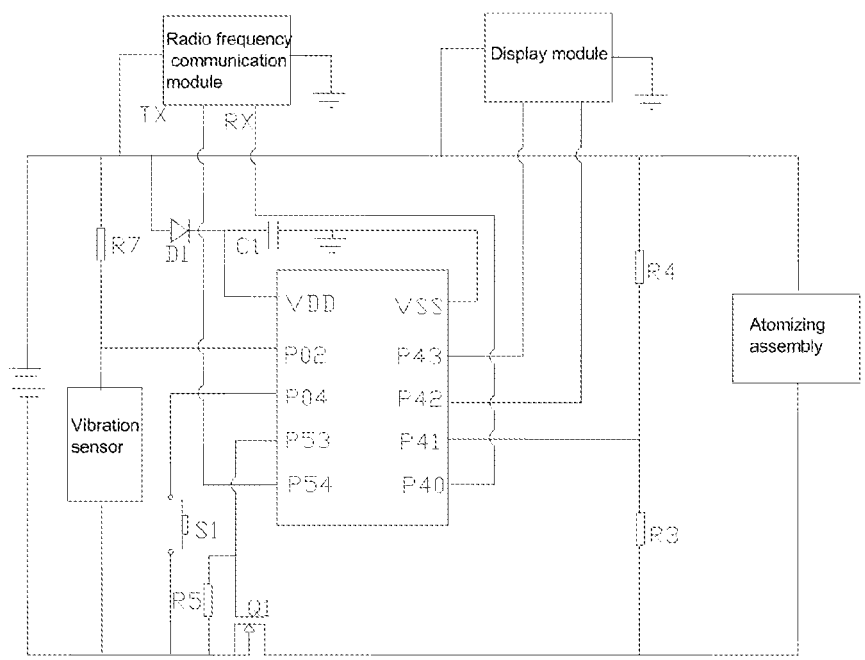
FIG. 7 is a circuit diagram of an electronic cigarette in a preferred embodiment of present invention.

The detailed circuit of the electronic cigarette is shown in FIG. 7. In the implementation shown in this circuit diagram, smoking button S1 is used to generate smoking signals. The model of the vibration sensor is csx-sen-180, which is a normally open switch, when there is a shock, the switch will be closed, and when it is quiescent condition without a shock, the switch can be switched off. The vibration sensor and a seventh resistance R7 are in series connection, and connect with positive and negative electrodes of the battery, respectively. A P02 pin of the microprocessor is connected with one end of the vibration sensor and one end of the seventh resistance R7 for transmitting the vibration signal to the microprocessor. One end of the smoking key S1 is connected with a P04 pin, and the other end is connected with a negative electrode of the battery. The display module 34 is connected with a data line SDA and a pin P43, and the clock line SCL is connected with a pin P42. The RX end of the radio frequency communication module is connected with a P40 pin, the TX end is connected with the P54 pin. The source electrode and the drain electrode of the switch transistor Q1 are respectively connected with the negative electrode of the battery and the atomization assembly, and the grid electrode of the switch transistor Q1 is connected with a P53 pin. The microprocessor controls the switch transistor Q1 on and off through the electrical level of the P53 pin.

When the users shake the electronic cigarette, the vibration sensor detects the vibration signal and cuts off, so that the voltage of the pin P02 is increased. By this time, what the microprocessor receives is the vibration signal. At the same time, the microprocessor produces a suggestive signal by controlling the display module, and controls the preset time such as 5 seconds after producing the suggestive signal so as to select which type of the requesting information to be sent based on the times of typing the smoking key S1. After selecting the type, the microprocessor controls the radio frequency communication module to transmit requesting information of responding type. When the radio frequency communication module receives response information or requesting information of other electronic cigarette, it is through the display module to generate prompt and display response information or requesting information of other electronic cigarette.

In the embodiment of the invention, the information interaction method applying to the electronic cigarette is realized among the electronic cigarette which is provided with the radio frequency communication module 30, the microprocessor 31, and so on.

Figure 6:
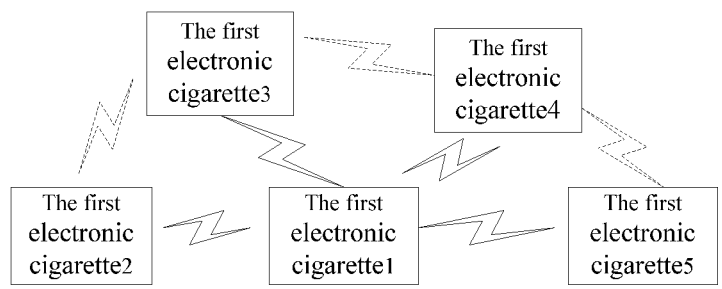
FIG. 6 is a connection diagram of the electronic cigarettes of the information interaction system applying to electronic cigarettes.

In the embodiment of the present invention, FIG. 6 is the connection diagram among the electronic cigarettes in the information interaction system applying to electronic cigarette. The information interaction system in the embodiment of the invention applying to electronic cigarettes comprises at least two electronic cigarettes performing information interaction within a certain distance, each electronic cigarette comprises: a radio frequency communication module, a microprocessor, a display module, a storage module, a prompt module, a smoking sensor, an input module, a vibration sensor and so on. The figure shows five electronic cigarettes which realize the communication connection with each other through their respective radio frequency communication module. Suppose the first electronic cigarette 1 is an electronic cigarette which sends the requesting information, and the rest electronic cigarettes are electronic cigarettes which receive the requesting information, then:

Shake the first electronic cigarette 1, the vibration sensor of the first electronic cigarette 1 detects the vibration signal and sends to the microprocessor. After receiving the vibration signal, the microprocessor can directly control the radio frequency communication module of the first electronic cigarette 1 to send the requesting information of requests for obtaining electronic cigarette information to the other one or more electronic cigarette. Or after receiving the vibration signal, the microprocessor first generates prompt information through the prompt module, and then the users select which type of the electronic cigarette information to be obtained through the input module, then the microprocessor sends requesting information of the corresponding type according to the selecting results. Of course, it can also select which type of the electronic cigarette information to be obtained according to the different smoking times produced by the smoking sensor after the microprocessor receiving the vibration signal. The type of the electronic cigarette information is in the requesting information for data field identifying.

The electronic cigarette receiving requesting information, for example, the microprocessor of the second electronic cigarette 2 controls the radio frequency communication module of the second electronic cigarette 2 to receive the requesting information. The microprocessor of the second electronic cigarette 2 confirms the type of electronic cigarette information requested to be obtained by the first electronic cigarette 1, and controls the radio frequency communication module of the second electronic cigarette 2 to transmit response information with its own electronic cigarette information to the first electronic cigarette 1.

The microprocessor of the first electronic cigarette 1 controls the radio frequency communication module of the first electronic cigarette 1 to receive the electronic cigarette information in the response information, and performs at least one of following operations: stores the obtained electronic cigarette information into the storage module, controls the display module to display the acquired electronic cigarette information, controls the prompt module to send prompt according to the acquired electronic cigarette information, controls the radio frequency communication module to forward the acquired electronic cigarette information or delete the acquired electronic cigarette information.

In the embodiments of the present invention, the first electronic cigarette can transmit requesting information in broadcasting way, the electronic cigarette receives the requesting information can be any one or more from the second electronic cigarette to the fifth electronic cigarette, and the electronic cigarette replies to the response information can be one or several of the electronic cigarettes receive the requesting information.

Preferably, in the embodiment of the present invention, the vibration sensor of the electronic cigarette is used for receiving a smoking signal and then transmitting it to the microprocessor; the microprocessor then controls the radio frequency communication module to transmit requesting information or response information according to the received smoking signal.

Understandably, in FIG. 6, the interaction of the request information, response information, emergency call information among the electronic cigarettes is realized by adopting the information interaction method in the embodiment (FIG. 1 and FIG. 4) described above.

The electronic cigarette in the embodiment of the present invention having a radio frequency communication function within a small range, can exchange information with other electronic cigarette having a radio frequency communication function within a small range, this greatly facilitates the information exchange between electronic cigarettes. Thus, the electronic cigarette is not only a cigarette, but also becomes a bridge for people communicating with each other.

The information interaction method applying to the electronic cigarette in the embodiments of the present invention enables the electronic cigarettes to obtain electronic cigarette information of each other after the interactive communication. Besides, through the statistical treatment of the electronic cigarette information, it can help users in choosing the optimal and suitable electronic cigarettes for themselves; on the other hand, it can facilitate building social connection between the users of electronic cigarettes, and can be conducive to communication between users and quitting smoking. Also, the present invention can realize an emergency call, which supplies users with a security guarantee, improving user experience. Additionally, with shaking of the electronic cigarette to generate a vibration signal so as to trigger the electronic cigarette to send requesting information, it has the effects of convenient and flexible use.

While the embodiments of the present application are described with reference to the accompanying drawings above, the present application is not limited to the abovementioned specific implementations. In fact, the abovementioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

What is claimed is:

1. An information interaction method applying to electronic cigarettes, wherein used for at least two electronic cigarettes comprising at least one first electronic cigarette and at least one second electronic cigarette to transmit information by using electromagnetic wave signals to perform information interaction within a preset distance;
the information interaction method comprises following steps:
after the first electronic cigarette detecting a vibration signal of the first electronic cigarette itself, transmitting requesting information with requesting for second electronic cigarette information to the second electronic cigarette;
the second electronic cigarette which receives the requesting information transmits response information with the second electronic cigarette information to the first electronic cigarette which transmits the requesting information;
the first electronic cigarette which transmits the requesting information receives the response information to obtain the second electronic cigarette information of the response information, and performs at least one of the following operations: storing the obtained second electronic cigarette information, displaying the obtained second electronic cigarette information, transmitting prompt information according to the obtained second electronic cigarette information, forwarding the obtained second electronic cigarette information.

2. The information interaction method applying to electronic cigarettes according to claim 1, wherein after the first electronic cigarette detecting the vibration signal of the first electronic cigarette itself, selecting a type of the second electronic cigarette information being obtained, and transmitting the requesting information corresponding to the type of the second electronic cigarette information being obtained.

3. The information interaction method applying to electronic cigarettes according to claim 2, wherein types of the second electronic cigarette information comprises at least one kind of followings information: an second electronic cigarette model, an second electronic cigarette battery capacity size, an second electronic cigarette applicable charger model, information of second electronic cigarette manufacturers, an second electronic cigarette manufacturing country and personal user information.

4. The information interaction method applying to electronic cigarettes according to claim 3, wherein the requesting information comprises: a heading code field, an identification code field, a data field and a check code field;
wherein the data field of the requesting information is used to identify the type of the second electronic cigarette information being obtained which the requesting information requests;
wherein the response information comprises: a heading code field, an identification code field, a data field and a check code field;
wherein the data field of the response information is used to identify the type of the second electronic cigarette information being obtained and a corresponding second electronic cigarette information.

5. The information interaction method applying to electronic cigarettes according to claim 4, wherein selecting the type of the second electronic cigarette information being obtained by detecting times of smoking signals produced;
the times of smoking signals produced is corresponding to the type of the second electronic cigarette information being obtained and identified by the data field of the requesting information or the response information.

6. The information interaction method applying to electronic cigarettes according to claim 4, wherein selecting the type of the second electronic cigarette information being obtained by an input module;
signals inputted by the input module is corresponding to the types of the second electronic cigarette information being obtained and identified by the data field of the requesting information or response information.

7. The information interaction method applying to electronic cigarettes according to claim 1, wherein the information interaction method further comprises:
after the first electronic cigarette which transmits the requesting information receiving the response information and obtaining the second electronic cigarette information of the response information, processing the obtained second electronic cigarette information.

8. An information interaction method applying to electronic cigarettes, wherein the method is used for at least two electronic cigarettes comprising at least one first electronic cigarette and at least one second electronic cigarette to transmit information by using electromagnetic wave signals to perform information interaction within an area formed by a preset distance:
the information interaction method comprises following steps:
transmitting information step: after the first electronic cigarette in the area detecting a vibration signal of the first electronic cigarette itself then transmitting broadcast information with first electronic cigarette information to the second electronic cigarette in the area, and/or transmitting requesting information with request for second electronic cigarette information to the second electronic cigarettes in the area, and/or transmitting response information for replying to request of the second electronic cigarette;

receiving information step: the second electronic cigarette receives the broadcast information transmitted by the first electronic cigarettes in the area with the first electronic cigarette information, and/or receives requesting information with requesting for the second electronic cigarette information transmitted by the first electronic cigarette in the area, and/or receives response information replied by the first electronic cigarettes requested;

processing information step: the second electronic cigarette which receives the broadcast information or receives the response information performs at least one of the following operations: storing the obtained first electronic cigarette information, displaying the obtained first electronic cigarette information, transmitting a-prompt information according to the obtained first electronic cigarette information, and forwarding the obtained first electronic cigarette information.

9. An information interaction system applying to electronic cigarettes, wherein the system comprises at least two electronic cigarettes performing information interaction within a preset distance, the at least two electronic cigarettes comprises at least one first electronic cigarette and at least one second electronic cigarette, each of the first electronic cigarette and the second electronic cigarette comprises: a vibration sensor, a radio frequency communication module, a microprocessor, a storage module, and a prompt module;

the vibration sensor of the first electronic cigarette which transmits requesting information is used for detecting a vibration signal of the first electronic cigarette which transmits the requesting information and transmitting the vibration signal to the microprocessor of the first electronic cigarette which transmits the requesting information;

the microprocessor of the first electronic cigarette which transmits the requesting information is used for controlling the radio frequency communication module of the first electronic cigarette which transmits the requesting information to transmit requesting information with request for second electronic cigarette information to the second electronic cigarette;

the microprocessor of the second electronic cigarette which receives the requesting information is used for controlling the radio frequency communication module of the second electronic cigarette which receives the requesting information to receive the requesting information, identifying a type of the second electronic cigarette information requested by the first electronic cigarette which transmits the requesting information, and controlling the radio frequency communication module of the second electronic cigarette which receives the requesting information to transmit response information with the second electronic cigarette information to the first electronic cigarette which transmits the requesting information;

the microprocessor of the first electronic cigarette which transmits the requesting information is further used for controlling the radio frequency communication module of the first electronic cigarette which transmits the requesting information to receive the second electronic cigarette information of the response information, and performs at least one of the following operations: storing the obtained second electronic cigarette information in the storage module, controlling a display module to display the obtained second electronic cigarette information, controlling the prompt module according to the obtained second electronic cigarette information to transmit prompt information, controlling the radio frequency communication module to forward the obtained second electronic cigarette information, deleting the obtained second electronic cigarette information.

10. The information interaction system applying to electronic cigarettes according to claim 9, wherein each of the first electronic cigarette and the second electronic cigarette comprises: a smoking sensor or a smoking button;

the smoking sensor or the smoking button is used for generating a smoking signal and transmitting the smoking signal to the microprocessor;

the microprocessor controls the radio frequency communication module according to the received smoking signal to transmit the requesting information or the response information.

11. The information interaction system applying to electronic cigarettes according to claim 9, wherein each of the first electronic cigarette and the second electronic cigarette further comprises an input module which is used for inputting a select signal to the microprocessor to select a type of the first or second electronic cigarette information being obtained, the input module is connected with the microprocessor.

* * * * *